(12) United States Patent
Enkisch-Krug et al.

(10) Patent No.: US 10,125,290 B2
(45) Date of Patent: *Nov. 13, 2018

(54) COATING COMPOSITIONS COMPRISING DIISOCYANATE CHAIN EXTENDED BISASPARTATES

(71) Applicant: AXALTA COATING SYSTEMS IP CO., LLC, Wilmington, DE (US)

(72) Inventors: Charlotte Enkisch-Krug, Hagen (DE); Carmen Flosbach, Wuppertal (DE); Ann Vaes, Putte (BE); Leen Tanghe, Kontich (BE); Jozef Huybrechts, Turnhout (BE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/120,267

(22) PCT Filed: Feb. 16, 2015

(86) PCT No.: PCT/US2015/016009
§ 371 (c)(1),
(2) Date: Aug. 19, 2016

(87) PCT Pub. No.: WO2015/130502
PCT Pub. Date: Sep. 3, 2015

(65) Prior Publication Data
US 2017/0058146 A1  Mar. 2, 2017

(30) Foreign Application Priority Data
Feb. 25, 2014 (EP) .................................... 14156578

(51) Int. Cl.
*C08G 18/32* (2006.01)
*C09D 175/02* (2006.01)
*B05D 7/00* (2006.01)
*C08G 18/75* (2006.01)
*C08G 18/79* (2006.01)
*C08G 18/80* (2006.01)
*C08G 18/38* (2006.01)
*B05D 1/02* (2006.01)
*B05D 7/14* (2006.01)

(52) U.S. Cl.
CPC ............. *C09D 175/02* (2013.01); *B05D 1/02* (2013.01); *B05D 7/14* (2013.01); *B05D 7/50* (2013.01); *B05D 7/51* (2013.01); *C08G 18/3253* (2013.01); *C08G 18/3259* (2013.01); *C08G 18/3262* (2013.01); *C08G 18/3821* (2013.01); *C08G 18/755* (2013.01); *C08G 18/792* (2013.01); *C08G 18/8058* (2013.01)

(58) Field of Classification Search
CPC .............. C09D 175/02; C08G 18/3253; C08G 18/3259; C08G 18/3262; B05D 3/00
See application file for complete search history.

(56) References Cited

U.S. PATENT DOCUMENTS

| | | | |
|---|---|---|---|
| 4,677,154 A | 6/1987 | Narayan et al. | |
| 5,126,170 A | 6/1992 | Zweiner et al. | |
| 5,597,930 A * | 1/1997 | Wicks | C08G 18/3821 525/131 |
| 5,633,336 A | 5/1997 | Rainer et al. | |
| 5,821,326 A * | 10/1998 | Kurek | C07C 227/18 528/332 |
| 6,183,870 B1 | 2/2001 | Hergenrother et al. | |
| 2004/0147648 A1* | 7/2004 | Corcoran | C08G 18/3821 524/186 |

FOREIGN PATENT DOCUMENTS

| | | |
|---|---|---|
| CA | 2048444 C | 2/1992 |
| DE | 102006002153 A1 | 7/2007 |
| EP | 1081171 A2 | 7/2001 |
| GB | 2184733 A | 7/1987 |
| WO | 2004063242 A1 | 7/2004 |
| WO | 2005073188 A1 | 8/2005 |
| WO | 2009086026 A1 | 7/2009 |
| WO | 2013098186 A1 | 7/2013 |

OTHER PUBLICATIONS

EPO, International Search Report issued in International Application No. PCT/US2015/016008, dated May 7, 2015.
EPO, Written Opinion of the ISA issued in International Application No. PCT/US2015/016008, dated May 7, 2015.
EPO, International Search Report issued in International Application No. PCT/US2015/016009, dated May 15, 2015.
EPO, Written Opinion of the ISA issued in International Application No. PCT/US2015/016009, dated May 15, 2015.
EPO, International Preliminary Report on Patentability issued in International Application No. PCT/US2015/016008, dated Sep. 9, 2016.
EPO, International Preliminary Report on Patentability issued in International Application No. PCT/US2015/016009, dated Sep. 9, 2016.

* cited by examiner

*Primary Examiner* — Michael L Leonard
(74) *Attorney, Agent, or Firm* — Lorenz & Kopf, LLP

(57) ABSTRACT

This invention relates to a coating composition, a method for coating of a metallic substrate as well as the use of a chain-extended aspartate prepolymer for improving the early hardness of the coating composition and in a two-component coating composition.

20 Claims, No Drawings

COATING COMPOSITIONS COMPRISING DIISOCYANATE CHAIN EXTENDED BISASPARTATES

CROSS-REFERENCE TO RELATED APPLICATIONS

This application is a U.S. National-Stage entry under 35 U.S.C. § 371 based on International Application No. PCT/US2015/016009, filed Feb. 16, 2015, which was published under PCT Article 21(2) and which claims priority to European Application No. 14156578.8, filed Feb. 25, 2014, which are all hereby incorporated in their entirety by reference.

TECHNICAL FIELD

This invention relates to a coating composition, a method for coating of a metallic substrate as well as the use of a chain-extended aspartate prepolymer for improving the early hardness of the coating composition in a two-component coating composition.

BACKGROUND

Coating compositions are well-known in the art and are used in a great variety of applications such as for primers, base coats and clear coats in vehicle original coatings and vehicle repair coatings. In this regard, great efforts have been made to develop coating compositions imparting the desired properties to the substrate or article to be coated. For example, coatings have been developed for e.g. protecting against abrasion, chemicals, corrosion, heat or mechanical impact. Furthermore, in vehicle repair coatings, there is an increasing demand in the market for fast drying coating compositions at room temperature.

In this regard, aspartate based coating compositions are well known in the art. For example, EP 0 403 921 describes coating compositions with binders based on a polyisocyanate component and an isocyanate-reactive component containing specific secondary polyamines. These secondary polyamines are also called polyaspartic acid derivatives and are based on reaction products of primary polyamines and diesters of maleic and/or fumaric acid. EP 0 470 461 also describes coating compositions for vehicle refinish applications containing a polyisocyanate component and an isocyanate-reactive secondary diamine prepared from 3,3'-dimethyl 4,4'-diamino dicyclohexylmethane and maleic diethylester. The isocyanate-reactive component further contains a hydroxyl-functional component consisting of polyhydroxypolyacrylates or mixtures of polyhydroxypolyacrylates and polyesterpolyols. WO 2005/073188 refers to aspartates which are prepared by first reacting a di- or polyamine with an unsaturated ester and then reacting the resultant product with a maleimide. U.S. Pat. No. 5,633,336 A refers to low-viscosity (cyclo)-aliphatic polyamines containing urea groups and having more than two amino groups that may be prepared by reacting (cyclo)aliphatic diamines with polyisocyanates containing isocyanurate groups or biuret groups. Such polyamines are useful as components in PUR reaction finishes and coating and adhesive compositions. WO 2013/098186 A1 refers to an aqueous urethane resin composition consisting mainly of the following (A) component and containing the following (B) and (C) components: (A) hydrophilic polyol, (B) water dispersible polyisocyanate, (C) aspartic acid ester having a secondary amino group. WO 2009/086026 discloses a transparent organic solvent-based clear coat coating composition comprising at least one binder with functional groups containing active hydrogen, in particular hydroxyl groups, at least one polyisocyanate cross-linking agent with free isocyanate groups and at least one epoxy-functional silane.

The above aspartate based coating compositions possess fast curing times. However, the balance of potlife of these coating compositions and early hardness development after application is not sufficient for certain applications, i.e. the viscosity of the compositions increases too rapidly after mixing the single components and prior to the application of the coating composition to a substrate. Furthermore, the mechanical and optical properties, such as adhesion and interlayer adhesion in a multi-layer structure, abrasion, chemical and corrosion resistance, yellowing in the pot and yellowing of the aspartate component on storage, of a coating obtained by applying and curing the coating composition on a substrate should be maintained on a high level.

Thus, the object of the present invention is to provide a coating composition having a well-balanced drying performance, i.e. fast curing times at a sufficient potlife, preferably a potlife of at least 30 min at room temperature, as well as a fast early hardness development, and in which the mechanical and optical properties, such as adhesion and interlayer adhesion in a multi-layer structure, abrasion, chemical and corrosion resistance, yellowing in the pot and yellowing of the aspartate component on storage, of the obtained coating are maintained on a high level.

In addition, other objects, desirable features and characteristics will become apparent from the subsequent summary and detailed description, and the appended claims, taken in conjunction with the accompanying drawings and this background.

SUMMARY

This invention relates to a coating composition comprising:
a) a chain-extended aspartate prepolymer, wherein the chain-extended aspartate prepolymer
  x) is free of isocyanate groups,
  xi) has an NH equivalent weight of from 250 to 1,000 g, and
  xii) is a reaction product of
    i) a mixture comprising at least one di-aspartic acid ester and at least one amino-functional mono-aspartic acid ester, wherein the molar ratio between the at least one di-aspartic acid ester and the at least one amino-functional mono-aspartic acid ester is from 99.5:0.5 to 50:50, and
    ii) at least one cycloaliphatic polyisocyanate, and
b) at least one curing agent having free isocyanate groups.

The present invention is also directed to a method for coating of a metallic substrate, the method comprising at least the steps of:
a) applying the coating composition as defined herein to at least a portion of a metallic substrate to be coated, and
b) curing the coating composition of step a).

The present invention is further directed to the use of a chain-extended aspartate prepolymer as defined herein for improving the early hardness of a coating composition. The present invention is still further directed to the use of the coating composition as defined herein in a two-component coating composition.

Surprisingly, it has been found that according to the present invention, coating compositions can be formulated having a well-balanced drying performance, i.e. the coating composition provides fast curing times at sufficient long potlife, preferably a potlife of at least 30 min at room temperature. The inventors of the present invention further surprisingly found out that such a coating composition being applied and cured on a substrate further provides mechanical and optical properties being on a high level. In particular, this is achieved by providing a coating composition comprising a defined chain-extended aspartate prepolymer and at least one curing catalyst.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The invention will be explained in greater detail below.

It will be appreciated that certain features of the invention which are, for clarity, described above and below in the context of separate embodiments may also be provided in combination in a single embodiment. Conversely, various features of the invention that are, for brevity, described in the context of a single embodiment may also be provided separately or in any sub-combination. In addition, references in the singular may also include the plural (for example, "a" and "an" may refer to one, or one or more) unless the context specifically states otherwise.

Unless stated otherwise, all molecular weights (both number and weight average molecular weight) referred to herein are determined by GPC (gel permeation chromatography) using polystyrene as the standard and tetrahydrofurane as the liquid phase eluent.

The coating compositions according to the invention are liquid coating compositions comprising a liquid carrier. The liquid carrier may be water and/or one or more organic solvents. Therefore, the coating composition can be water-based or organic solvent-based.

Water-based coating compositions are coating compositions, wherein water is used as solvent or thinner when preparing and/or applying the coating composition. Usually, water-based coating compositions may contain, for example, 30 to 90% by weight of water, based on the total amount of the coating composition and optionally, up to 30% by weight, preferably, below 15% by weight of organic solvents, based on the total amount of the coating composition.

Organic solvent-based coating compositions are coating compositions, wherein organic solvents are used as solvents or thinners when preparing and/or applying the coating composition. Usually, solvent-based coating compositions contain, for example, 20 to 90% by weight of organic solvents, based on the total amount of the coating composition.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with $C_1$ to $C_6$-alkyl, ethoxypropanol, butyl glycol; glycols, for example, ethylene glycol, propylene glycol, N-methyl pyrrolidone and ketones, e.g., methyl ethyl ketone, acetone, cyclohexanone; aromatic or aliphatic hydrocarbons, for example, toluene, xylene, or straight-chain or branched aliphatic $C_6$-$C_{12}$-hydrocarbons.

The individual components of the coating composition according to the invention are explained in greater detail below.

It is one requirement of the present coating composition that it comprises a chain-extended aspartate prepolymer. It is appreciated that the chain-extended aspartate prepolymer is a reaction product of a mixture comprising at least one di-aspartic acid ester and at least one amino-functional mono-aspartic acid ester.

For example, the at least one di-aspartic acid ester is a compound of Formula (I):

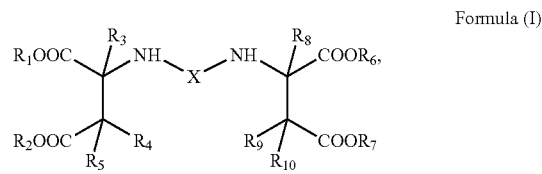

Formula (I)

wherein X represents a divalent organic group, obtained by removal of the amino groups from a primary diamine; $R_1$, $R_2$, $R_6$ and $R_7$ are the same or different organic groups which are inert towards isocyanate groups and $R_3$, $R_4$, $R_5$, $R_8$, $R_9$ and $R_{10}$ are the same or different and represent hydrogen or organic groups which are inert towards isocyanate groups.

It is preferred that X represents a divalent hydrocarbon group obtained by removal of the amino groups from the primary diamine. $R_1$, $R_2$, $R_6$ and $R_7$ are the same or different organic groups and are preferably the same organic groups. For example, $R_1$, $R_2$, $R_6$ and $R_7$ are the same or different, preferably the same, organic groups and are preferably methyl, ethyl or n-butyl, such as ethyl. $R_3$, $R_4$, $R_5$, $R_8$, $R_9$ and $R_{10}$ are preferably the same. In one embodiment, $R_3$, $R_4$, $R_5$, $R_8$, $R_9$ and $R_{10}$ are preferably the same and hydrogen.

An organic group which is inert towards isocyanate groups is an organic group which is inert towards isocyanate groups at a temperature of 150° C. or less, e.g. 110° C. or less.

The at least one di-aspartic acid ester, preferably the compound of Formula (I), is preferably a reaction product of at least one dialkyl maleate and/or dialkyl fumarate and at least one primary diamine. For example, the at least one di-aspartic acid ester, preferably the compound of Formula (I), is a reaction product of at least one dialkyl maleate or dialkyl fumarate and at least one primary diamine.

The term "at least one" in the meaning of the present invention means that the respective compound comprises, preferably consists of, one or more kinds of the compound.

For example, the at least one dialkyl maleate and/or dialkyl fumarate is one kind of dialkyl maleate and/or dialkyl fumarate. Alternatively, the at least one dialkyl maleate and/or dialkyl fumarate comprises, preferably consists of, two or more kinds of dialkyl maleate and/or dialkyl fumarate. For example, the at least one dialkyl maleate and/or dialkyl fumarate comprises, preferably consists of, two or three kinds of dialkyl maleate and/or dialkyl fumarate.

Preferably, the at least one dialkyl maleate and/or dialkyl fumarate is one kind of a dialkyl maleate and/or dialkyl fumarate.

In one embodiment of the present invention, the at least one di-aspartic acid ester, preferably the compound of Formula (I), is a reaction product of at least one dialkyl maleate and at least one primary diamine. Alternatively, the at least one di-aspartic acid ester, preferably the compound of Formula (I), is a reaction product of at least one dialkyl fumarate and at least one primary diamine.

The at least one amino-functional mono-aspartic acid ester is a compound of Formula (II) and/or (III):

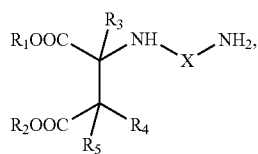

Formula (II)

wherein X represents a divalent organic group, obtained by removal of one amino group from a primary diamine; $R_1$ and $R_2$ are the same or different organic groups which are inert towards isocyanate groups and $R_3$, $R_4$ and $R_5$ are the same or different and represent hydrogen or organic groups which are inert towards isocyanate groups,
and/or

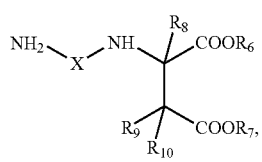

Formula (III)

wherein X represents a divalent organic group, obtained by removal of one amino group from a primary diamine; $R_6$ and $R_7$ are the same or different organic groups which are inert towards isocyanate groups and $R_8$, $R_9$ and $R_{10}$ are the same or different and represent hydrogen or organic groups which are inert towards isocyanate groups.

It is preferred that $R_1$, $R_2$, $R_6$ and $R_7$ are the same or different organic groups and are preferably the same organic groups. For example, $R_1$, $R_2$, $R_6$ and $R_7$ are the same or different, preferably the same, organic groups and are preferably methyl, ethyl or n-butyl, such as ethyl. $R_3$, $R_4$, $R_5$, $R_8$, $R_9$ and $R_{10}$ are preferably the same. In one embodiment, $R_3$, $R_4$, $R_5$, $R_8$, $R_9$ and $R_{10}$ are preferably the same and hydrogen.

The at least one amino-functional mono-aspartic acid ester, preferably the compound of Formula (II) and/or (III), is preferably a reaction product of at least one dialkyl maleate and/or dialkyl fumarate and at least one primary diamine. For example, the at least one amino-functional mono-aspartic acid ester, preferably the compound of Formula (II) and/or (III), is a reaction product of at least one dialkyl maleate or dialkyl fumarate and at least one primary diamine.

For example, the at least one dialkyl maleate and/or dialkyl fumarate is one kind of dialkyl maleate and/or dialkyl fumarate. Alternatively, the at least one dialkyl maleate and/or dialkyl fumarate comprises, preferably consists of, two or more kinds of dialkyl maleate and/or dialkyl fumarate. For example, the at least one dialkyl maleate and/or dialkyl fumarate comprises, preferably consists of, two or three kinds of dialkyl maleate and/or dialkyl fumarate.

Preferably, the at least one dialkyl maleate and/or dialkyl fumarate is one kind of a dialkyl maleate and/or dialkyl fumarate.

In one embodiment of the present invention, the at least one amino-functional mono-aspartic acid ester, preferably the compound of Formula (II) and/or (III), is a reaction product of at least one dialkyl maleate and at least one primary diamine. Alternatively, the at least one amino-functional mono-aspartic acid ester, preferably the compound of Formula (II) and/or (III), is a reaction product of at least one dialkyl fumarate and at least one primary diamine.

If the at least one di-aspartic acid ester, preferably the compound of Formula (I), and/or the at least one amino-functional mono-aspartic acid ester, preferably the compounds of Formula (II) and/or (III), is/are a reaction product of at least one dialkyl maleate and at least one primary diamine, the at least one dialkyl maleate is preferably selected from the group comprising dimethyl maleate, diethyl maleate, di-n-butyl maleate, di-iso-butyl maleate, di-tert-butyl maleate, diamyl maleate, di-n-octyl maleate, dilauryl maleate, dicyclohexyl maleate, di-tert-butylcyclohexyl maleate and mixtures thereof. More preferably, the at least one dialkyl maleate is diethyl maleate.

Alternatively, if the at least one di-aspartic acid ester, preferably the compound of Formula (I), and/or the at least one amino-functional mono-aspartic acid ester, preferably the compound of Formula (II) and/or (III), is/are a reaction product of at least one dialkyl fumarate and at least one primary diamine, the at least one fumarate is selected from the group comprising dimethyl fumarate, diethyl fumarate, di-n-butyl fumarate, di-iso-butyl fumarate, di-tert-butyl fumarate, diamyl fumarate, di-n-octyl fumarate, dilauryl fumarate, dicyclohexyl fumarate, di-tert-butylcyclohexyl fumarate and mixtures thereof.

Preferably, the at least one di-aspartic acid ester, preferably the compound of Formula (I), and the at least one amino-functional mono-aspartic acid ester, preferably the compound of Formula (II) and/or (III), are a reaction product of at least one dialkyl maleate and at least one primary diamine, wherein the at least one dialkyl maleate is selected from the group comprising dimethyl maleate, diethyl maleate, di-n-butyl maleate, di-iso-butyl maleate, di-tert-butyl maleate and mixtures thereof. More preferably, the at least one dialkyl maleate is selected from the group comprising dimethyl maleate, diethyl maleate, di-n-butyl maleate and mixtures thereof. Most preferably, the at least one dialkyl maleate is diethyl maleate.

It is appreciated that the at least one di-aspartic acid ester, preferably the compound of Formula (I), and/or the at least one amino-functional mono-aspartic acid ester, preferably the compound of Formula (II) and/or (III), is/are obtained by reacting the at least one dialkyl maleate and/or dialkyl fumarate as described above and at least one primary diamine.

In one embodiment of the present invention, the at least one primary diamine is one kind of a primary diamine. Alternatively, the at least one primary diamine comprises, preferably consists of, two or more kinds of primary diamines. For example, the at least one primary diamine comprises, preferably consists of, two or three kinds of primary diamines.

Preferably, the at least one primary diamine is one kind of a primary diamine.

The term "diamine" in the meaning of the present invention refers to a compound having two amino functional groups. Further, the term "primary" refers to an amino functional group in which one of three hydrogen atoms in ammonia is replaced by an aliphatic, cycloaliphatic, aralkyl or aromatic carbonyl group.

Thus, the at least one primary diamine is preferably selected from the group comprising ethylene diamine, 1,2-diaminopropane, 1,4-diaminobutane, 1,3-diaminopentane, 1,6-diaminohexane, 2,5-diamino-2,5-dimethylhexane, 2,2,4- and 2,4,4-trimethyl-1, 6-diaminohexane, 1,11-diaminoundecane, 1,12-diaminododecane, 1,3- and 1,4-cyclohexane diamine, 1-amino-3,3,5-trimethyl-5-aminomethylcyclohexane (IPDA), 2,4- and 2,6-hexahydrotoluylene diamine, 2,4'- and 4,4'-diaminodicyclohexyl methane and 3,3'-dialkyl-4, 4'-diaminodicyclohexylmethanes, such as 3, 3'-dimethyl-4, 4'-diaminodicyclohexyl methane and 3,3'-diethyl-4,4'-diaminodicyclohexylmethane, 2-methyl-1,5-pentanediamine and 1,3- and 1,4 xylylenediamine, tetramethyl xylylenediamine, 4,4'-diaminodicyclohexyl methane (PACM) and mixtures thereof.

Preferably, the at least one primary diamine is selected from the group comprising 1-amino-3,3,5-trimethyl-5-aminomethylcyclohexane (IPDA), 2,4'- and 4,4'-diaminodicyclohexyl methane (PACM) and 3,3'-dialkyl-4, 4'-diaminodicyclohexylmethanes, such as 3, 3'-dimethyl-4, 4'-diaminodicyclohexyl methane and 3,3'-diethyl-4,4'-diaminodicyclohexylmethane, 2-methyl-1,5-pentanediamine and mixtures thereof. More preferably, the at least one primary diamine is 1-amino-3,3,5-trimethyl-5-aminomethylcyclohexane (IPDA) and/or 4,4'-diaminodicyclohexyl methane (PACM). Most preferably, the at least one primary diamine is 1-amino-3,3,5-trimethyl-5-aminomethylcyclohexane (IPDA).

It is one further requirement of the present invention that the mixture comprises the at least one di-aspartic acid ester and the at least one amino-functional mono-aspartic acid ester such that the molar ratio between the at least one di-aspartic acid ester, preferably the compound of Formula (I), and the at least one amino-functional mono-aspartic acid ester, preferably the compound of Formula (II) and/or (III), is from 99.5:0.5 to 50:50.

In one embodiment of the present invention, the mixture comprises the at least one di-aspartic acid ester and the at least one amino-functional mono-aspartic acid ester such that the molar ratio between the at least one di-aspartic acid ester, preferably the compound of Formula (I), and the at least one amino-functional mono-aspartic acid ester, preferably the compound of Formula (II) and/or (III), is from 95:5 to 60:40.

It is appreciated that the at least one di-aspartic acid ester, preferably the compound of Formula (I), and/or the at least one amino-functional mono-aspartic acid ester, preferably the compound of Formula (II) and/or (III), is/are preferably obtained by reacting the at least one dialkyl maleate and/or dialkyl fumarate and the at least one primary diamine in an equivalent ratio of dialkyl maleate and/or dialkyl fumarate to primary diamine from 2:1 to 1:4. Preferably, the at least one di-aspartic acid ester, preferably the compound of Formula (I), and/or the at least one amino-functional mono-aspartic acid ester, preferably the compound of Formula (II) and/or (III), is/are obtained by reacting the at least one dialkyl maleate and/or dialkyl fumarate and the at least one primary diamine in an equivalent ratio of dialkyl maleate and/or dialkyl fumarate to primary diamine from 1:1 to 1:3. More preferably, the at least one di-aspartic acid ester, preferably the compound of Formula (I), and/or the at least one amino-functional mono-aspartic acid ester, preferably the compound of Formula (II) and/or (III), is/are obtained by reacting the at least one dialkyl maleate and/or dialkyl fumarate and the at least one primary diamine in an equivalent ratio of dialkyl maleate and/or dialkyl fumarate to primary diamine from 1.8:1 to 2.2:1. Most preferably, the at least one di-aspartic acid ester, preferably the compound of Formula (I), and/or the at least one amino-functional mono-aspartic acid ester, preferably the compound of Formula (II) and/or (III), is/are obtained by reacting the at least one dialkyl maleate and/or dialkyl fumarate and the at least one primary diamine in an equivalent ratio of dialkyl maleate and/or dialkyl fumarate to primary diamine of about 2:1.

For example, the at least one di-aspartic acid ester, preferably the compound of Formula (I), and the at least one amino-functional mono-aspartic acid ester, preferably the compound of Formula (II) and/or (III), are preferably obtained by reacting the at least one dialkyl maleate or dialkyl fumarate and the at least one primary diamine in an equivalent ratio of dialkyl maleate or dialkyl fumarate to primary diamine from 2:1 to 1:4. Preferably, the at least one di-aspartic acid ester, preferably the compound of Formula (I), and the at least one amino-functional mono-aspartic acid ester, preferably the compound of Formula (II) and/or (III), are obtained by reacting the at least one dialkyl maleate or dialkyl fumarate and the at least one primary diamine in an equivalent ratio of dialkyl maleate or dialkyl fumarate to primary diamine from 1:1 to 1:3. More preferably, the at least one di-aspartic acid ester, preferably the compound of Formula (I), and the at least one amino-functional mono-aspartic acid ester, preferably the compound of Formula (II) and/or (III), are obtained by reacting the at least one dialkyl maleate or dialkyl fumarate and the at least one primary diamine in an equivalent ratio of dialkyl maleate or dialkyl fumarate to primary diamine from 1.8:1 to 2.2:1. Most preferably, the at least one di-aspartic acid ester, preferably the compound of Formula (I), and the at least one amino-functional mono-aspartic acid ester, preferably the compound of Formula (II) and/or (III), are obtained by reacting the at least one dialkyl maleate or dialkyl fumarate and the at least one primary diamine in an equivalent ratio of dialkyl maleate or dialkyl fumarate to primary diamine of about 2:1.

The mixture of the at least one di-aspartic acid ester, preferably the compound of Formula (I), and the at least one amino-functional mono-aspartic acid ester, preferably the compound of Formula (II) and/or (III), is preferably prepared in known manner by reacting the corresponding at least one dialkyl maleate and/or dialkyl fumarate and at least one primary diamine. For example, the preparation of the mixture comprising the at least one di-aspartic acid ester, preferably the compound of Formula (I), and the at least one amino-functional mono-aspartic acid ester, preferably the compound of Formula (II) and/or (III), from the above mentioned starting materials is carried out, for example, at a temperature of from 0 to 150° C. using the starting materials in such proportions that the mixture comprising the at least one di-aspartic acid ester, preferably the compound of Formula (I), and the at least one amino-functional mono-aspartic acid ester, preferably the compound of Formula (II) and/or (III), is obtained. Excess of starting materials can be removed by distillation after the reaction. The reaction may be carried out solvent-free or in the presence of suitable organic solvents.

Accordingly, the at least one di-aspartic acid ester, preferably the compound of Formula (I), and the at least one amino-functional mono-aspartic acid ester, preferably the compound of Formula (II) and/or (III), can be prepared simultaneously, i.e. the mixture is readily obtained by reacting the corresponding at least one dialkyl maleate and/or dialkyl fumarate and at least one primary diamine. Alternatively, the at least one di-aspartic acid ester, preferably the compound of Formula (I), and the at least one amino-functional mono-aspartic acid ester, preferably the compound of Formula (II) and/or (III), can be prepared separately, i.e. each of the at least one di-aspartic acid ester, preferably the compound of Formula (I), and the at least one amino-functional mono-aspartic acid ester, preferably the compound of Formula (II) and/or (III), is obtained by reacting the corresponding at least one dialkyl maleate and/or dialkyl fumarate and at least one primary diamine and then mixed with each other in a suitable ratio.

It is one requirement of the present invention that the chain-extended aspartate prepolymer is obtained by reacting the mixture comprising the at least one di-aspartic acid ester, preferably the compound of Formula (I), and the at least one amino-functional mono-aspartic acid ester, preferably the compound of Formula (II) and/or (III), as defined above and at least one cycloaliphatic polyisocyanate.

In one embodiment of the present invention, the at least one polyisocyanate is one kind of a cycloaliphatic polyisocyanate. Alternatively, the at least one cycloaliphatic polyisocyanate comprises, preferably consists of, two or more kinds of cycloaliphatic polyisocyanate. For example, the at least one cycloaliphatic polyisocyanate comprises, preferably consists of, two or three kinds of cycloaliphatic polyisocyanates.

Preferably, the at least one cycloaliphatic polyisocyanate is one kind of a cycloaliphatic polyisocyanate.

The at least one cycloaliphatic polyisocyanate can be any kind of organic polyisocyanate with cycloaliphatically bound free isocyanate groups. The at least one cycloaliphatic polyisocyanate is preferably liquid at room temperature or become liquid through the addition of organic solvents.

In one embodiment of the present invention, the at least one cycloaliphatic polyisocyanate has an average NCO functionality from 1.5 to 6.0. Preferably, the at least one cycloaliphatic polyisocyanate has an average NCO functionality from 1.8 to 4.0 and most preferably of about 3.0.

The at least one cycloaliphatic polyisocyanate suitable for preparing the chain-extended aspartate prepolymer is preferably selected from the group comprising 1-isocyanato-3,3,5-trimethyl-5-isocyanatomethyl-cyclohexane (IPDI), 4,4'-diisocyanatocyclohexylmethane, cyclotrimers and/or biurets of 1-isocyanato-3,3,5-trimethyl-5-isocyanatomethyl-cyclohexane, 4,4'-diisocyanatocyclohexylmethane and mixtures thereof. More preferably, the at least one cycloaliphatic polyisocyanate is 1-isocyanato-3,3,5-trimethyl-5-isocyanatomethyl-cyclohexane (IPDI).

It is appreciated that the chain-extended aspartate prepolymer is preferably obtained by reacting the mixture comprising the at least one di-aspartic acid ester, preferably the compound of Formula (I), and the at least one amino-functional mono-aspartic acid ester, preferably the compound of Formula (II) and/or (III), with the at least one cycloaliphatic polyisocyanate in an equivalent ratio of NH and $NH_2$ groups in the mixture to NCO groups of the at least one cycloaliphatic polyisocyanate from 2.0:0.2 to 2.0:1.8. Preferably, the chain-extended aspartate prepolymer is obtained by reacting the mixture comprising at least one di-aspartic acid ester, preferably the compound of Formula (I), and the at least one amino-functional mono-aspartic acid ester, preferably the compound of Formula (II) and/or (III), with the at least one cycloaliphatic polyisocyanate in an equivalent ratio of NH and $NH_2$ groups in the mixture to NCO groups of the at least one cycloaliphatic polyisocyanate from 2.0:0.4 to 2.0:1.4. Most preferably, the chain-extended aspartate prepolymer is obtained by reacting the mixture comprising at least one di-aspartic acid ester, preferably the compound of Formula (I), and the at least one amino-functional mono-aspartic acid ester, preferably the compound of Formula (II) and/or (III), with the at least one cycloaliphatic polyisocyanate in an equivalent ratio of NH and $NH_2$ groups in the mixture to NCO groups of the at least one cycloaliphatic polyisocyanate of about 2.0:0.6.

The chain-extended aspartate prepolymer is preferably prepared in known manner by reacting the mixture comprising at least one di-aspartic acid ester, preferably the compound of Formula (I) and at least one amino-functional mono-aspartic acid ester, preferably the compound of Formula (II) and/or (III), with the at least one cycloaliphatic polyisocyanate. For example, the preparation of the chain-extended aspartate prepolymer from the above mentioned starting materials may be carried out, for example, at a temperature of from 0 to 150° C. using the starting materials in such proportions that the chain-extended aspartate prepolymer is obtained. Excess of starting materials may be removed by distillation after the reaction. The reaction may be carried out solvent-free or in the presence of suitable organic solvents.

Accordingly, the chain-extended aspartate prepolymer is preferably a cycloaliphatically chain-extended aspartate prepolymer.

The chain-extended aspartate prepolymer may be further characterized by its equivalent ratio of aspartate groups to urea groups. Preferably, the chain-extended aspartate prepolymer comprises an equivalent ratio of aspartate groups to urea groups from 10:1 to 1:0.9. More preferably, the chain-extended aspartate prepolymer comprises an equivalent ratio of aspartate groups to urea groups from 5:1 to 1:0.9. Most preferably, the chain-extended aspartate prepolymer comprises an equivalent ratio of aspartate groups to urea groups of about 2.0:0.6.

It is one requirement of the present invention that the chain-extended aspartate prepolymer is free of isocyanate groups.

It is a further requirement of the present invention that the chain-extended aspartate prepolymer has an NH equivalent weight of from 250 to 1,000 g. Preferably, the chain-extended aspartate prepolymer has an NH equivalent weight of from 300 to 750 g.

A further requirement of the present invention is that the coating composition comprises at least one curing agent having free isocyanate groups.

In one embodiment of the present invention, the at least one curing agent having free isocyanate groups is one kind of a curing agent. Alternatively, the at least one curing agent having free isocyanate groups comprises, preferably consists of, two or more kinds of curing agents. For example, the at least one curing agent having free isocyanate groups comprises, preferably consists of, two or three kinds of curing agents.

Preferably, the at least one curing agent having free isocyanate groups is one kind of a curing agent.

The at least one curing agent having free isocyanate groups suitable for the coating composition is preferably at least one polyisocyanate.

The curing agent having free isocyanate groups can be any organic polyisocyanate with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 3,500 mPas, preferably of 5 to 3,000 mPas.

The preferred curing agent having free isocyanate groups are a polyisocyanate or polyisocyanate mixtures with exclusively aliphatically and/or cycloaliphatically bound isocyanate groups with an average NCO functionality of 1.5 to 6.0, preferably 1.8 to 4.0.

For example, the at least one curing agent having free isocyanate groups suitable for the coating composition is preferably selected from the group comprising hexamethylene diisocyanate (HDI), 1-isocyanato-3,3,5-trimethyl-5-isocyanatomethyl-cyclohexane (IPDI), bis(isocyanatocyclohexyl)-methane and their derivatives, 2,2',5 trimethylhexane diisocyanate and mixtures thereof and reaction products thereof. More preferably, the at least one curing agent having free isocyanate groups is selected from the group comprising hexamethylene diisocyanate (HDI), 1-isocyanato-3,3,5-trimethyl-5-isocyanatomethyl-cyclohexane (IPDI), 2,2',5 trimethylhexane diisocyanate and mixtures thereof. Most preferably, the at least one curing agent having free isocyanate groups is hexamethylene diisocyanate (HDI) or 1-isocyanato-3,3,5-trimethyl-5-isocyanatomethyl-cyclohexane (IPDI).

Sterically hindered curing agent having free isocyanate groups are also suitable. Examples of these are 1,1,6,6-tetramethyl-hexamethylene diisocyanate, p- or m-tetramethylxylylene diisocyanate and the appropriate hydrated homologues.

In principle, diisocyanates can be converted by the usual processes to higher functional compounds, for example, by trimerization or by reaction with water or polyols, such as, for example, trimethylolpropane or glycerine. Thus, the at least one curing agent having free isocyanate groups can also be used in the form of its reaction product such as isocyanate-modified resins or isocyanate-functional prepolymers. Generally, the at least one curing agent having free isocyanate groups can be isocyanurates, uretdione diisocyanates, biuret group-containing polyisocyanates, urethane group-containing polyisocyanates, allophanate group-containing polyisocyanates, polyester and polyether containing polyisocyanates, polyacrylic containing polyisocyanates, isocyanurate and allophanate group-containing polyisocyanates, carbodiimide group containing polyisocyanates and polyisocyanates containing acylurea groups.

The at least one curing agent having free isocyanate groups can be used individually or in combination with one another. The at least one curing agent having free isocyanate groups is preferably one commonly used in the paint industry. They are described in detail in the literature and are also commercially available.

Typically, following production, the reaction products of the at least one curing agent having free isocyanate groups are freed from surplus parent diisocyanate, preferably by distillation, with only a residue content of less than 0.5% by weight. Triisocyanates, such as triisocyanatononan can also be used.

It is appreciated that the at least one cycloaliphatic polyisocyanate used for preparing the chain-extended aspartate prepolymer and the at least one curing agent having free isocyanate groups can be the same or different. In one embodiment of the present invention, the at least one cycloaliphatic polyisocyanate used for preparing the chain-extended aspartate prepolymer and the at least one curing agent having free isocyanate groups are the same.

The isocyanate groups of the at least one curing agent having free isocyanate groups may be partially blocked. Low molecular weight compounds containing active hydrogen for blocking NCO groups are known. Examples of those blocking agents are aliphatic or cycloaliphatic alcohols, dialkylamino alcohols, oximes, lactams, imides, hydroxyalkyl esters and esters of malonic or acetoacetic acid.

The coating composition can be in the form of a one-component or two-component coating composition.

Preferably, the coating composition is a two-component coating composition. In other words, the components which are reactive towards one another, namely the chain-extended aspartate prepolymer and the at least one curing agent having free isocyanate groups, must be stored separately from one another prior to application in order to avoid a premature reaction. Generally, the chain-extended aspartate prepolymer and the at least one curing agent having free isocyanate groups may only be mixed together shortly before application. The term "shortly before application" is well-known to a person skilled in the art. The time period within which the ready-to-use coating composition may be prepared prior to the actual use/application depends, e.g., on the potlife of the coating composition. Compositions with very short potlife may be applied by two-component spray guns, where the reactive components are separately fed into a static mixer and applied directly afterwards.

Preferably, the chain-extended aspartate prepolymer, and the at least one curing agent having free isocyanate groups are formulated together in one composition.

Either transparent or pigmented colored coating compositions can be produced. Therefore, the coating compositions according to the invention are suited for use as clear coats but can be pigmented with conventional pigments and used as pigmented topcoats, basecoats or undercoats such as sealer, primer or primer surfacer. They can be used to coat a substrate with a single coat or within a multilayer coating of substrates. Use as clear coat and colored pigmented topcoat is preferred, in particular in a multilayer coating.

It is appreciated that the coating composition of the present invention preferably comprises further compounds as additives. For example, the instant coating composition further comprises at least one compound selected from the group comprising curing catalysts, antioxidants, additives, pigments, extenders, UV screeners, compounds with at least one alkoxy silane group and/or at least one epoxy group, hydroxyl functional binders as acrylics, polyesters, HALS derivatives, inorganic rheology control agents such as silica's and organic sag control agents based on polyurea and/or polyamide, and mixtures thereof.

In one embodiment of the invention, the coating composition comprises at least one compound containing at least one alkoxy silane group and/or at least one epoxy group. For example, the coating composition comprises at least one compound containing at least one alkoxy silane group and at least one epoxy group. Preferably, the at least one compound containing at least one alkoxy silane group and/or at least one epoxy group is not a polyaspartic acid ester and is not a polyisocyanate. The compound containing at least one alkoxy silane group and/or at least one epoxy group is preferably a monomeric compound. Examples of said compound are compounds having at least one alkoxy silane group corresponding to Formula (IV)

wherein $R_1$, $R_2$, $R_3$ are the same or different organic groups with 1 to 30 carbon atoms per molecule, provided that at least one of the residues $R_1$, $R_2$ and $R_3$ is an alkoxy group with 1 to 4 carbon atoms.

The compound containing at least one alkoxy silane group and/or at least one epoxy group preferably contains in addition to the alkoxy silane group at least one epoxy group. Preferably the at least one compound containing at least one alkoxy silane group and at least one epoxy group is a compound of the general Formula (V),

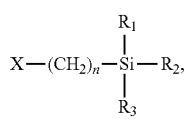

wherein X represents the residues

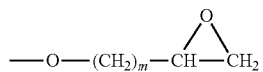

with m being 1-4; or represents 3,4-epoxycyclohexyl; $R_1$, $R_2$, $R_3$ are the same or different organic residues with 1 to 30 carbon atoms, provided that at least one of the residues $R_1$, $R_2$ and $R_3$ is an alkoxy group with 1 to 4 carbon atoms; and n is 2, 3 or 4, preferably 2 or 3.

Preferred compounds of the Formula (V) are those in which X is

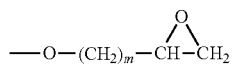

with m being 1 to 4.

Compounds in which $R_1$, $R_2$ and $R_3$ are the same or different alkoxy groups having 1 to 4, preferably 1, 2 or 3 carbon atoms are likewise preferred. Particularly preferred alkoxy groups are methoxy, ethoxy and isopropoxy groups.

Examples of particularly suitable epoxy-functional silane compounds of the general Formula (V) are (3-glycidoxypropyl)trimethoxysilane, (3-glycidoxypropyl)triethoxysilane, (3-glycidoxypropyl)triisopropoxysilane, beta-(3,4-epoxycyclohexyl)ethyltrimethoxysilane and beta-(3,4-epoxycyclohexyl) ethyltriethoxysilane. Silanes with methoxy groups, such as for example (3-glycidoxypropyl) trimethoxysilane and beta-(3,4-epoxycyclohexyl)ethyltrimethoxysilane are particularly preferred here.

It is most preferred to use (3-glycidoxypropyl)trimethoxysilane.

Epoxy-functional silane compounds of Formula (V) which may be used are also obtainable as commercial products, for example under the trade name DYNASILAN® Glymo from Degussa, SILQUEST® A-187 and SILQUEST® A-186 from GE Silicones.

The compound containing at least one alkoxy silane group and/or at least one epoxy group, specifically the preferred compounds of Formula (V), can be used in amounts of 0.25 to 5.0% by weight solids, in particular of 1.0 to 3.0% by weight solids and most preferred of 2.0 to 3.0% by weight solids, relative to the sum of the solids content of the chain-extended aspartate prepolymer and the at least one curing agent having free isocyanate groups being present in the coating composition. If the compound containing at least one alkoxy silane group and/or at least one epoxy group is used in quantities of greater than 5.0% by weight solids this can lead to inferior viscosity and color stability of the multilayer coating. If the compound containing at least one alkoxy silane group and/or at least one epoxy group is used in quantities of less than 0.25% by weight solids the described positive effects, specifically the adhesion effects, may not be achieved.

If the coating composition is in the form of a two-component coating composition, the compound containing at least one alkoxy silane group and/or at least one epoxy group may be present in one of the two components or in both components of the two-component coating system. Most preferred the compound containing at least one alkoxy silane group and/or at least one epoxy group is present in the polyisocyanate component.

Additionally or alternatively, the coating composition can comprise an antioxidant, preferably an antioxidant component comprising A1) at least one sterically hindered phenol antioxidant and/or A2) at least one organophosphite antioxidant. Preferably, the coating composition comprises an antioxidant, preferably an antioxidant component comprising A1) at least one sterically hindered phenol antioxidant and A2) at least one organophosphite antioxidant.

Suitable sterically hindered phenol antioxidants A1) include 2,4-dimethyl-6-butylphenol, 4,4'methylene-bis(2,6-di-tert-butylphenol), 2,6-di-tert. butyl-N,N'dimethyl-amino-p-cresol, butylated hydroxyanisole, 2,6-di-tertbutylphenol, 2,4,6-tri-tertbutylphenol, 2-tert-butylphenol, 2,6-di-isopropylphenol, 2-methyl-6-tert-butylphenol, 2,4-dimethyl-6-tertbutylphenol, 4-(N,N-dimethylaminomethyl)-2,8-di-tertbutylphenol, 4-ethyl-2,6-di-tertbutylphenol. Sterically hindered phenols are also commercially available as antioxidants, for example, under the tradename Irganox®1010 and Irganox®1135 from BASF.

According to one embodiment the sterically hindered phenol antioxidant comprises 3,5-di-tert.-butyl-4-hydroxy toluene, also known as butylated hydroxy toluene or in short "BHT".

Suitable organophosphite antioxidants A2) include those organophosphites known for use as antioxidants. In one embodiment, the organophosphite comprises one or more compounds according to the formula $(RO)_3P$, wherein each R is independently alkyl or aryl.

As used herein, the term "alkyl" is a radical of a saturated aliphatic group, including straight chain alkyl groups, branched chain alkyl groups, and cycloalkyl groups, wherein such straight and branched chain alkyl groups may each be optionally substituted with cycloalkyl, such cycloalkyl groups may optionally be substituted with straight or branched chain alkyl groups, and such straight chain alkyl, branched chain alkyl and cycloalkyl groups may each be optionally substituted with aryl, and includes, for example, methyl, ethyl, isopropyl, t-butyl, isodecyl, stearyl, icosyl, cyclohexyl and phenylmethyl.

As used herein, the term "aryl" is a group containing one or more 6-membered unsaturated hydrocarbon rings, wherein the unsaturation may be represented formally by three conjugated double bonds and which may optionally be substituted at one or more carbon atoms of such rings by independently selected alkyl groups, and includes, for example, phenyl, naphthyl, methylphenyl, dimethoxyphenyl, 5-isopropyl-2-methylphenyl, methylphenyl, t-butylphenyl, nonylphenyl.

In one embodiment, each R of formula $(RO)_3P$ is independently an alkyl group with 1-30 carbon atoms, e.g. with 5-30 carbon atoms, or an aryl group with 1-30 carbon atoms. Examples of suitable organophosphite antioxidants are triisodecylphosphite, diphenylisodecylphosphite, diphenylisooctylphosphite, trilaurylphosphite tributylphosphite, trioctyl phosphite, triphenylphosphite, trinonylphenylphosphite, tributyltripentylphosphite, tris(2, 4-di-tert-butylphenyl)phosphite. In one embodiment, the organophosphite antioxidant comprises a trialkyl phosphite, which is, e.g., one wherein each alkyl group has less than 9 carbon atoms, more specifically 3 to 5 carbon atoms. Examples are tri-n-propyl phosphite, tri-isopropyl phosphite, tri-n-pentyl phosphite, tri-butyl phosphites, such as tri-n-butyl, tri-sec-butyl, tri-iso-butyl, and tri-tert-butyl phosphite. Each of the three alkyl groups in a given molecule may be the same or different. Each alkyl group may be straight-chained or branched.

If the antioxidant comprises an antioxidant component comprising A1) at least one sterically hindered phenol antioxidant and A2) at least one organophosphite antioxidant, the antioxidant component comprises the at least one sterically hindered phenol antioxidant A1) and the at least one organophosphite antioxidant A2) in a ratio by weight of 3.0:0.5 to 0.5:0.3 and preferably of 1:1.

According to one embodiment of the present invention, the antioxidant component comprises BHT as the at least one sterically hindered phenol antioxidant A1) and at least one organophosphite antioxidant A2) selected from the group consisting of trisnonylphenylphosphite, triphenylphosphite, triisodecylphosphite, diphenylisodecylphosphite, diphenylisooctylphosphite, trilaurylphosphite and tris(2,4-di-tert-butylphenyl)phosphite. According to another embodiment, the antioxidant component comprises BHT as the at least one sterically hindered phenol antioxidant A1) and the at least one organophosphite antioxidant A2) selected from the group consisting of trisnonylphenylphosphite, triphenylphosphite, triisodecylphosphite, diphenylisodecylphosphite, diphenylisooctylphosphite, trilaurylphosphite and tris(2,4-di-tert-butylphenyl)phosphite in the above ratio by weight.

Most preferred the antioxidant component comprises BHT and trisnonylphenylphosphite or comprises BHT and triphenylphosphite. The antioxidant component can also consist of BHT and trisnonylphenylphosphite or consist of BHT and triphenylphosphite.

If the coating composition comprises the antioxidant, preferably the antioxidant component comprising A1) at least one sterically hindered phenol antioxidant and/or A2) at least one organophosphite antioxidant, the coating composition comprises 0.5 to 4.0% by weight, preferably 2.0% by weight of the antioxidant, relative to the total amount of the coating composition.

The coating compositions, according to the invention, can further contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica and graphite effect pigments. Examples of fillers are silicon dioxide, barium sulphate, talcum, aluminium silicate and magnesium silicate.

The additives are additives usually used in the paint industry. Examples of such additives are light stabilizers, for example, based on benzotriazoles and HALS (hindered amine light stabilizer) compounds, flow control agents based on (meth)acrylic homopolymers or silicon oils, rheology-influencing agents, such as silica, preferably highly disperse silicic acid, or sag control agents, thickeners, such as cross-linked polycarboxylic acid or polyurethanes, anti-foaming agents and wetting agents. The additives are added in the usual amounts familiar to the person skilled in the art. Pigments, fillers and additives generally used for paint may be used in one and/or both components of the two-component system.

In another aspect, the present invention also relates to a method for coating of a metallic substrate comprising the following steps:
 a) applying the coating composition as defined herein to at least a portion of a metallic substrate to be coated, and
 b) curing the coating composition of step a).

It is preferred that the curing of the coating composition is preferably carried out by means of thermal energy.

The coating composition is applied according to step a) of the method to an optionally pre-coated metallic substrate.

Metallic substrates can be any industrial goods to be coated with two-component coating compositions such as two-component polyurethane coating compositions. Preferred metallic substrates are vehicle bodies and vehicle body parts. Metallic substrates which may be used are the various materials, e.g. used in industrial coating and vehicle construction, for example, metals, such as, iron, zinc, aluminium, magnesium, stainless steel or the alloys thereof.

The coating composition may be applied by conventional application methods. Examples of application methods are brushing, roller application, knife coating, dipping and spraying. Spray application is preferred. After an optional flash-off phase, the coating layers may then be cured or the next coating layer is applied.

Preferably, the applied coating composition is cured for example, at temperatures of from −20 to 100° C., preferably from −10 to 80° C., more preferably from 0 to 60° C. and most preferably from 10 to 40° C. Even if not preferred lower curing temperatures may also be used, but would lead to longer curing times. The coating composition can alternatively even be cured at higher temperatures of, for example, 80 to 160° C. or above.

The method preferably comprises applying multiple layers of coating compositions to at least a portion of a metallic substrate. In this regard, it is appreciated that at least one layer, preferably one layer, of the multiple layers comprises the instant coating composition. Accordingly, the further layers of the multiple layers can also comprise the instant coating composition or a coating composition differing from the instant coating composition. Thus, the instant coating composition can be adjacent to the metallic substrate, or the optional pre-coat, or an interlayer of the multiple layer structure or the outer layer of the multiple layers.

The multiple layers are preferably applied either wet in wet or by first curing one layer before applying the next layer of the multiple layers. If the multiple layers are applied by first curing one layer before applying the next layer of the multiple layers, the one layer is preferably first cured for a sufficient time and at a sufficient temperature before the next layer of the multiple layers is applied. Regarding the curing temperature, it is referred to the temperatures set out above when defining the curing temperature of the applied coating composition.

It is appreciated that the coating composition of the present invention features a well-balanced drying performance, i.e. fast curing times at sufficient potlife, preferably a potlife of at least 30 min at room temperature. Furthermore, the mechanical and optical properties of the obtained coating, such as adhesion and interlayer adhesion in a multi-layer structure, abrasion, chemical and corrosion resistance, yellowing in the pot and yellowing of the aspartate component on storage, are maintained on a high level.

The coating composition and the method, according to the invention, are suitable for automotive and industrial coatings. In the automotive coatings sector, the coatings and the method can be used for coating vehicle bodies and vehicle body parts in both vehicle production line painting and vehicle refinishing. They can also be used for coating large vehicles and transportation vehicles, such as, trucks, busses and railroad cars, where curing temperatures of from −20 to 100° C., preferably from −10 to 80° C., more preferably from 0 to 60° C. and most preferably from 10 to 40° C., can be used. Most preferred the coating compositions and the method can be used in vehicle and vehicle part refinishing. For refinishing, curing temperatures of, for example, −10 to 80° C., preferably from 0 to 60° C. and most preferably from 10 to 40° C., are used. Furthermore, the coating composition and the method can be used for coating any industrial goods other than motor vehicles.

The use of the specific chain-extended aspartate prepolymer offers an improved early hardness of the coating composition. In particular, it is to be noted that coating composition of the present invention feature a better early hardness and thus dries faster than a coating composition that does not comprise the chain-extended aspartate prepolymer.

In view of the advantages obtained, the present invention is further directed to the use of the chain-extended aspartate prepolymer as defined herein for improving the early hardness of the coating composition. Furthermore, the present invention is directed to the use of the coating composition as defined herein in a two-component coating composition The invention will be explained in more detail on the basis of the examples below. All parts and percentages are on a weight basis unless otherwise indicated.

EXAMPLES

Measurement Methods

The following measurement methods are used to evaluate the parameters given in the examples and claims.

Hazen Color

The color has been measured in the Hazen scale (based on ASTM D1209) on the BYK LCSIII device.

Gardner-Holdt (Bubble) Viscosity

This method allows to quickly determine the kinematic viscosity of liquids such as resins and varnishes. Certified tubes from Byk Gardner are used for the measurement of the viscosity at room temperature.

Potlife

The potlife of the compositions was measured by determining the viscosity (DIN4 cup) increase as a function of time. The potlife is defined as the time required for increasing the initial viscosity by 1.5. The potlife defines the period during which the clear coat composition is still easy to spray.

Viscosity

The viscosity of the activated clear coat was determined according to DIN 53211 with a DIN 4 flow cup at room temperature (20±3° C.).

Hardness

The coating is applied on a glass with a dry film thickness of about 50 micron. The hardness is measured according to the Fischer hardness test (indentation hardness according to ASTM D1474). The results are expressed in Knoop.

Solids

The weight percentage of solids in the resin was determined by weighing approximately 1 g of sample in an aluminum dish with a diameter of 55 mm containing a paperclip. A small amount of acetone was added and a uniform layer was produced by stirring with the paperclip. Then, the dish was placed in an oven at about 105° C. (±1° C.) for about 1 hour and weighed again. The weight percentage of solids was calculated by using the Formula (VI):

% solids=100%×(residue weight/sample weight)     (VI)

The solids were determined by measuring two samples. The given result is thus the average of two samples.

Materials

The solvent n-butylacetate is commercially available from BASF SE, Germany, Celanese, USA or Oxea GmbH, Germany.

The solvent PGMEA is commercially available from BASF SE, Germany, the Dow Chemical Company, USA or Lyondell Basell, Germany.

The solvent BGA is commercially available from BASF SE, Germany or Ineos Oxide, Germany.

The UV absorber is commercially available from BASF SE, Germany as Tinuvin 384-2.

The UV stabilizer is commercially available from BASF SE, Germany as Tinuvin 292.

The silicone additive is commercially available from Byk Chemie GmbH, Germany as silicone Byk 315 and from OMG Borchers, Germany as Baysilone OL17.

The acrylic additive is commercially available from Byk Chemie GmbH, Germany as acrylic Byk 361.

The hindered phenol and tris nonylphenyl phosphite additive is commercially available from Oxiris Chemicals, Germany as hindered phenol BHT (ionol, butylated hydroxytoluene) or Dover Chemicals, USA as tris nonylphenyl phosphite Doverphos4HP.

EXAMPLES

The following examples illustrate the preparation of chain-extended aspartate prepolymers and coating compositions comprising the chain-extended aspartate prepolymer.

Comparative Example 1 (CE1): A Bisaspartate of Isophoronediamine and Diethylmaleate In a reactor equipped with a propeller type of stirrer, a thermometer, condenser and feeding system was loaded 204.91 grams of isophorone diamine and 34.44 grams of n-butylacetate. The mixture was heated to 30° C. 6.89 grams each of 2,6-di-tertiary butyl-4-methylphenol and trisnonylphenyl phosphite were dissolved in 414.99 grams of diethylmaleate and 10.33 grams of n-butylacetate and were fed to the reactor content over about 4 hours followed by a rinsing step of 10.33 grams of n-butylacetate. The reactor temperature was kept at 50° C. max and after the addition, the contents were kept for 46 hours.

Test Results:

| | |
|---|---|
| Solids (%) | 84.3 |
| Viscosity (Gardner Holdt) | A+ |
| Color (Hazen) | 15 |
| GC area mono aspartate/bisaspartate | 15/85 |

The GC area was determined on an instrument from Interscience by injecting a sample at 250° C. on a 100% dimethylpolysiloxane column having a length of 30 m. A constant Helium flow of 1 ml/min starting at 2 min and 120°

C. and increasing temperature of 10° C. per min till 300° C. For this reaction product, the amino-functionalized mono-aspartic acid ester was detected between 14 and 16 min while the di-aspartic acid ester was detected between 19 and 21 min.

Comparative Example 2 (CE2): A Bisaspartate of p-Aminocyclohexylmethane (PACM) and Diethylmaleate In a reactor equipped with a propeller type of stirrer, a thermometer, condenser and feeding system was loaded 341 grams of PACM (Vestamine PACM from Evonik) and 50 grams of n-butylacetate. The mixture was heated to 30° C. 10 grams each of 2,6-di-tertiary butyl-4-methylphenol and trisnonylphenyl phosphite were dissolved in 559 grams of diethylmaleate and 15 grams of n-butylacetate and were fed to the reactor content over about 2 hours followed by a rinsing step of 15 grams of n-butylacetate. The reactor temperature was kept at 50° C. for about 24 hours and an additional 24 hours at 60° C.

Test Results:

| Solids (%) | 86.4 |
| Viscosity (Gardner Holdt) | F− |
| Color (Hazen) | 30 |
| GC area mono aspartate/bisaspartate | 30/70 |

The GC area was determined on an instrument from Interscience by injecting a sample at 250° C. on a 100% dimethylpolysiloxane column having a length of 30 m. A constant Helium flow of 1 ml/minute starting at 2 min and 120° C. and increasing temperature of 10° C. per min till 300° C. For this reaction product, the amino-functionalized mono-aspartic acid ester was detected between 17 and 22 min, while the di-aspartic acid ester was detected between 25 and 35 min.

Inventive Example 3 (IE3): Isophorone Diisocyanate Chain Extended Reaction Product of Example 2

615 grams of the reaction product of example 2 taken was diluted with 176 grams of n-butylacetate and heated in the reactor till 40° C. 67 grams of isophorone diisocyanate mixed with 14 grams of n-butylacetate were added to the reactor over 1 hour while keeping the reactor at 50° C. max. After a rinsing step with 14 grams of n-butylacetate, the reactor contents were kept at 50° C. till the NCO has disappeared as measured by IR spectrometry. The results of the end-product are found below.

Test Results:

| Solids (%) | 68 |
| Viscosity (Gardner Holdt) | H |
| Color (Hazen) | 8 |

Comparative Examples 4A (CE4A) and 4B (CE4B): Hexamethylene Diisocyanate Chain Extended Reaction Product of Example 1

571 grams of the reaction product of example 1 was diluted with 163 grams of n-butylacetate and mixed in the reactor at room temperature. 67 grams (A) or 50.4 grams (B) of hexamethylene diisocyanate mixed with 14 grams (A) or 10.8 grams (B) of n-butylacetate were added to the reactor over 1 hour while keeping the reactor at 50° C. max. After a rinsing step with 14 grams (A) or 10.8 grams (B) of n-butylacetate, the reactor contents were kept at about 40° C. till the NCO has disappeared as measured by IR spectrometry. The results of the end-products are found below.

|  | 4A | 4B |
|---|---|---|
| Solids (%) | 67.4 | 67.6 |
| Viscosity (Gardner Holdt) | D + ½ | A |
| Color (Hazen) | 16 | 19 |

Example 5: Preparation of Clear Coats Based on Comparative Examples 1, 2, 4A and 4B as Well as Inventive Example 3

The clear coat compositions have been prepared by activating with a polyisocyanate activator based on 60.67% Desmodur®N3390 (Aliphatic polyisocyanate HDI trimer, 90% solids, Bayer), 36.93% n-butylacetate and an epoxy-functional silane (2.4% Silquest®A187 from Momentive Performance Materials). The clear coat formulations and the activators have been mixed by hand in a ratio so that the NCO to NH ratio has been kept constant at 1.21.

The clear coats 5A, 5B, 5C, 5D and 5E have been formulated with the components shown in the Table 1 below.

TABLE 1

| Component | Type of product | Ref 5A (wt.-%) | Ref 5B (wt.-%) | Invention 5C (wt.-%) | Ref 5D (wt.-%) | Ref 5E (wt.-%) |
|---|---|---|---|---|---|---|
| CE1 | binder | 72.22 | | | | |
| CE2 | binder | | 72.22 | | | |
| IE3 | binder | | | 77.26 | | |
| CE4A | binder | | | | 77.26 | |
| CE4B | binder | | | | | 77.26 |
| n-butylacetate | Solvent | 17.81 | 17.81 | 12.77 | 12.77 | 12.77 |
| PGMEA | Solvent | 2.1 | 2.1 | 2.1 | 2.1 | 2.1 |
| BGA | Solvent | 2 | 2 | 2 | 2 | 2 |
| UV protection | UV absorber/stabilizer | 3.32 | 3.32 | 3.32 | 3.32 | 3.32 |
| Flow & levelling additives | Silicone and acrylic additives | 0.55 | 0.55 | 0.55 | 0.55 | 0.55 |
| Hindered phenol and tris | Anti-yellowing additives | 2 | 2 | 2 | 2 | 2 |

TABLE 1-continued

| Component | Type of product | Ref 5A (wt.-%) | Ref 5B (wt.-%) | Invention 5C (wt.-%) | Ref 5D (wt.-%) | Ref 5E (wt.-%) |
|---|---|---|---|---|---|---|
| nonylphenyl phosphite | | | | | | |

The spray viscosities have been measured at 20° C. in a DIN4 cup.

The results are outlined in Table 2. From Table 2 it can be gathered that in case of clear coat 5B, the reactivity is higher than for clear 5A, resulting in a shorter potlife of clear coat 5B. Table 2 also demonstrates that the chain-extended aspartate prepolymers of CE4A (5D) and CE4B (5E) have a higher reactivity than the chain-extended aspartate prepolymer of IE3 (5C), which is a reaction product of a mixture comprising at least one di-aspartic acid ester and at least one amino-functional mono-aspartic acid ester, and at least one cycloaliphatic polyisocyanate, resulting in a longer potlife for the later.

TABLE 2

| Clear coat | Ref 5A | Ref 5B | Invention 5C | Ref 5D | Ref 5E |
|---|---|---|---|---|---|
| Gram activator | 108.3 | 99.96 | 55.8 | 51.37 | 57.46 |
| Initial spray viscosity | 13.3" | 13.9" | 13.9" | 14.9" | 13.9" |
| Viscosity after 45 min. | 19" | 22.1" | 16" | 23.9" | 21.9" |
| Potlife | 45-50' | 30-45' | 1 h 20 | 30-45' | 30-45' |

The activated clear coat compositions were sprayed over a glass panel and air dried. The hardness is measured at a dry film thickness of 50 micron according the Fischer hardness test. The results are expressed in Knoop and are outlined in Table 3.

TABLE 3

| Clear Coate | Ref 5B | Invention 5C | Ref 5D | Ref 5E |
|---|---|---|---|---|
| Gram activator | 99.96 | 55.8 | 51.37 | 57.46 |
| Fischer hardness 1 hour (Knoop) | 0.87 | 0.61 | 0.17 | 0.27 |
| Fischer hardness 4 hours (Knoop) | 5.38 | 4.45 | 1.87 | 3 |
| Fischer hardness 1 day (Knoop) | 7.98 | 7.6 | 5.01 | 6.35 |
| Fischer hardness 1 week (Knoop) | 9.57 | 9.35 | 7.52 | 8.21 |

The results in Table 3 clearly show that the clear coat references 5D and 5E have a lower initial hardness than clear coat 5C prepared from the chain-extended aspartate prepolymer of IE3, which is a reaction product of a mixture comprising at least one di-aspartic acid ester and at least one amino-functional mono-aspartic acid ester, and at least one cycloaliphatic polyisocyanate.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A coating composition comprising:
   a) a chain-extended aspartate prepolymer, wherein the chain-extended aspartate prepolymer
      x) is free of isocyanate groups,
      xi) has an NH equivalent weight of from 250 to 1,000 g, and
      xii) is a reaction product of
         i) a mixture comprising at least one di-aspartic acid ester and at least one amino-functional mono-aspartic acid ester, wherein the molar ratio between the at least one di-aspartic acid ester and the at least one amino-functional mono-aspartic acid ester is from 99.5:0.5 to 50:50, and
         ii) at least one cycloaliphatic polyisocyanate, and
   b) at least one curing agent having free isocyanate groups.

2. The coating composition of claim 1, wherein the at least one di-aspartic acid ester and/or the at least one amino-functional mono-aspartic acid ester is/are a reaction product of at least one dialkyl maleate and/or dialkyl fumarate and at least one primary diamine.

3. The coating composition of claim 1, wherein the at least one di-aspartic acid ester and/or the at least one amino-functional mono-aspartic acid ester has/have been obtained by reacting the at least one dialkyl maleate and/or dialkyl fumarate and the at least one primary diamine in an equivalent ratio of dialkyl maleate and/or dialkyl fumarate to primary diamine from 2:1 to 1:4.

4. The coating composition of claim 2, wherein:
   the at least one dialkyl maleate is selected from the group of dimethyl maleate, diethyl maleate, di-n-butyl maleate, di-iso-butyl maleate, di-tert-butyl maleate, diamyl maleate, di-n-octyl maleate, dilauryl maleate, dicyclohexyl maleate, di-tert-butylcyclohexyl maleate and mixtures thereof; or
   the at least one dialkyl fumarate is selected from the group comprising dimethyl fumarate, diethyl fumarate, di-n-butyl fumarate, di-iso-butyl fumarate, di-tert-butyl fumarate, diamyl fumarate, di-n-octyl fumarate, dilauryl fumarate, dicyclohexyl fumarate, di-tert-butylcyclohexyl fumarate and mixtures thereof.

5. The coating composition of claim 2, wherein the at least one primary diamine is selected from the group of ethylene diamine, 1,2-diaminopropane, 1,4-diaminobutane, 1,3-diaminopentane, 1,6-diaminohexane, 2,5-diamino-2,5-dimethylhexane, 2,2,4- and 2,4,4-trimethyl-1, 6-diaminohexane, 1,11-diaminoundecane, 1,12-diaminododecane, 1,3- and 1,4-cyclohexane diamine, 1-amino-3,3,5-trimethyl-5-aminomethylcyclohexane (IPDA), 2,4- and 2,6-hexahydrotoluylene diamine, 2,4'- and 4,4'-diamino-dicyclohexyl methane and 3,3'-dialkyl-4, 4'-diaminodicyclohexylmethanes, and mixtures thereof.

6. The coating composition of claim 1, wherein the at least one cycloaliphatic polyisocyanate is selected from 1 socyanato-3,3,5-trimethyl-5-isocyanatomethyl-cyclohexane (IPDI), 4,4'-diisocyanatocyclohexylmethane, cyclotrimers or biurets of 1 socyanato-3,3,5-trimethyl-5-isocyanatomethyl-cyclohexane, 4,4'-diisocyanatocyclohexylmethane and mixtures thereof.

7. The coating composition of claim 1, wherein the chain-extended aspartate prepolymer has been obtained by reacting the mixture comprising at least one di-aspartic acid ester and at least one amino-functional mono-aspartic acid ester with the at least one cycloaliphatic polyisocyanate in an equivalent ratio of NH and $NH_2$ groups in the mixture to NCO groups of the at least one cycloaliphatic polyisocyanate from 2.0:0.2 to 2.0:1.8.

8. The coating composition of claim 1, wherein the chain-extended aspartate prepolymer comprises an equivalent ratio of aspartate groups to urea groups from 10:1 to 1:0.9.

9. The coating composition of claim 1, wherein the at least one curing agent having free isocyanate groups is selected from the group of hexamethylene diisocyanate (HDI), 1 socyanato-3,3,5-trimethyl-5-isocyanatomethyl-cyclohexane (IPDI), bis(isocyanatocyclohexyl)-methane and their derivatives, 1,1,6,6-tetramethyl-hexamethylene diisocyanate, p- or m-tetramethylxylylene diisocyanate, 2,2',5 trimethylhexane diisocyanate and mixtures thereof and reaction products thereof.

10. The coating composition of claim 1, wherein the coating composition further comprises at least one compound selected from the group of curing catalysts, antioxidants, additives, pigments, extenders, UV screeners, compounds with at least one alkoxy silane group or at least one epoxy group, hydroxyl functional binders as acrylics, polyesters, HALS derivatives, inorganic rheology control agents, and mixtures thereof.

11. The coating composition claim 1, wherein the coating composition is a two-component coating composition.

12. A method for coating of a metallic substrate, the method comprising at least the steps of:
a) applying the coating composition of claim 1 to at least a portion of a metallic substrate to be coated, and
b) curing the coating composition of step a).

13. The method of claim 12, wherein multiple layers of coating compositions are applied to at least a portion of a metallic substrate and at least one of the layers comprises the coating composition and the multiple layers are applied either wet in wet or by first curing one layer before applying the next layer of the multiple layers.

14. A coating composition utilizing the chain-extended aspartate prepolymer of claim 1 for improving the early hardness of a coating composition.

15. A two-component coating composition utilizing the coating composition of claim 1.

16. The coating composition of claim 3, wherein:
the at least one dialkyl maleate is selected from the group of dimethyl maleate, diethyl maleate, di-n-butyl maleate, di-iso-butyl maleate, di-tert-butyl maleate, diamyl maleate, di-n-octyl maleate, dilauryl maleate, dicyclohexyl maleate, di-tert-butylcyclohexyl maleate and mixtures thereof; or
the at least one dialkyl fumarate is selected from the group of dimethyl fumarate, diethyl fumarate, di-n-butyl fumarate, di-iso-butyl fumarate, di-tert-butyl fumarate, diamyl fumarate, di-n-octyl fumarate, dilauryl fumarate, dicyclohexyl fumarate, di-tert-butylcyclohexyl fumarate and mixtures thereof.

17. The coating composition of claim 3, wherein the at least one primary diamine is selected from the group of ethylene diamine, 1,2-diaminopropane, 1,4-diaminobutane, 1,3-diaminopentane, 1,6-diaminohexane, 2,5-diamino-2,5-dimethylhexane, 2,2,4- and 2,4,4-trimethyl-1, 6-diaminohexane, 1,11-diaminoundecane, 1,12-diaminododecane, 1,3- and 1,4-cyclohexane diamine, 1-amino-3,3,5-trimethyl-5-aminomethylcyclohexane (IPDA), 2,4- and 2,6-hexahydrotoluylene diamine, 2,4'- and 4,4'-diamino-dicyclohexyl methane and 3,3'-dialkyl-4, 4'-diaminodicyclohexylmethanes, and mixtures thereof.

18. The coating composition of claim 1, further comprising an antioxidant component.

19. The coating composition of claim 18, wherein the antioxidant component comprises (A1) at least one sterically hindered phenol antioxidant and (A2) at least one organophosphite antioxidant.

20. The coating composition of claim 5, wherein the at least one primary diamine is selected from the group of 3, 3'-dimethyl-4, 4'-diaminodicyclohexyl methane and 3,3'-diethyl-4,4'-diaminodicyclohexylmethane, 2-methyl-1,5-pentanediamine and 1,3- and 1,4 xylylenediamine, tetramethyl xylylenediamine, 4,4'-diaminodicyclohexyl methane (PACM), and mixtures thereof.

* * * * *